Nov. 10, 1936.  M. FIELDMAN  2,060,294
HYDRAULIC SHOCK ABSORBER
Filed June 25, 1934
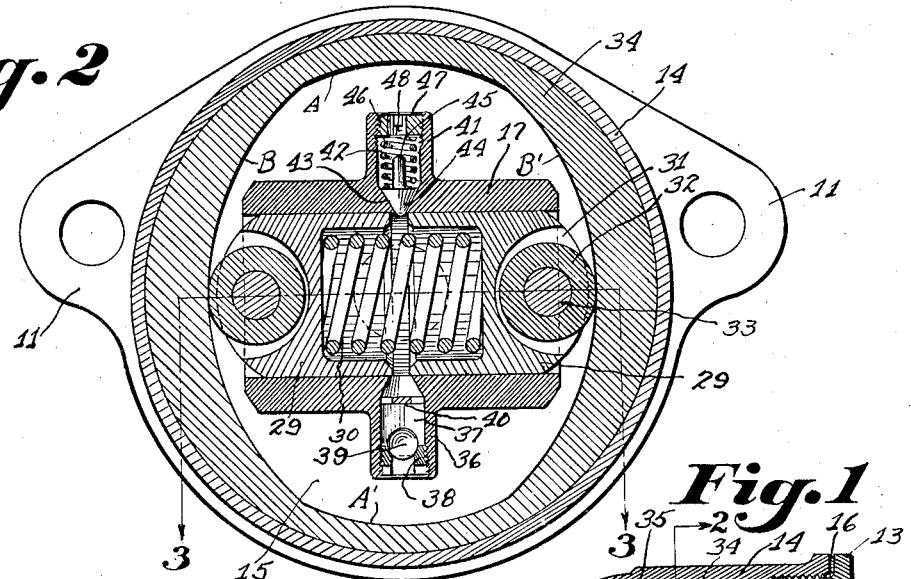
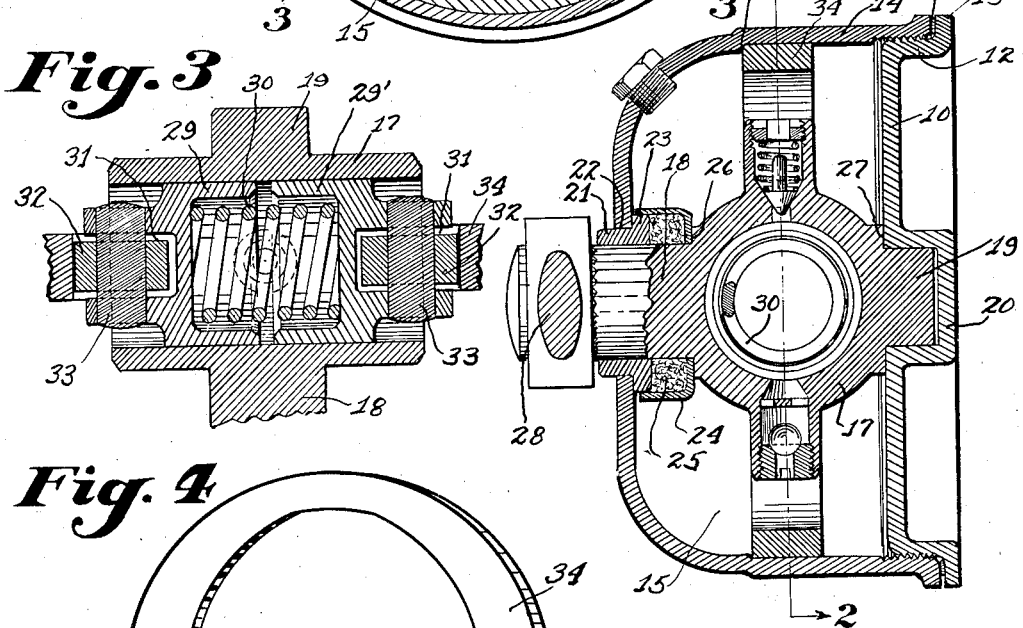
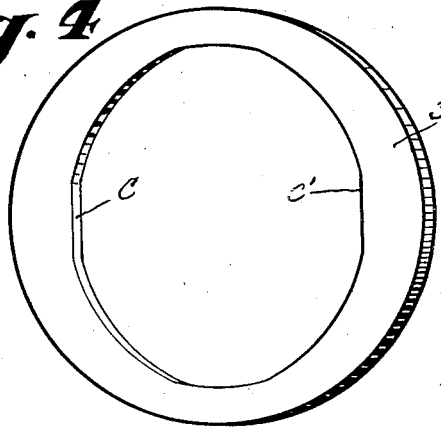
Michael Fieldman
INVENTOR
BY
Charles M. Hills
ATTYS.

Patented Nov. 10, 1936

2,060,294

UNITED STATES PATENT OFFICE 2,060,294

HYDRAULIC SHOCK ABSORBER

Michael Fieldman, Chicago, Ill., assignor to Houde Engineering Corporation, Buffalo, N. Y., a corporation of New York Application June 25, 1934, Serial No. 732,230

2 Claims. (Cl. 267—8)

My invention relates to hydraulic shock absorbers adapted particularly for application to automotive vehicles for controlling the action of the vehicle springs.

The invention relates particularly to that type of hydraulic shock absorber in which a housing for the hydraulic fluid is secured, usually on the chassis of an automotive vehicle, and a shaft, usually connected with the vehicle axle, is journaled in the housing to oscillate a structure for displacing the hydraulic fluid against predetermined resistance to the displacement flow.

The object of the invention is to provide a simple, economically manufactured and efficiently operating structure of the class referred to in which the oscillatable element is in the form of a cylinder structure provided with plungers displaceable therein by cam action, with suitable inlet for fluid to the cylinder which fluid is displaced against the resistance of suitable orifice or valve structures to thereby determine the shock absorber resistance to the operation of the vehicle springs.

The various features of my invention are incorporated in the structure disclosed on the drawing, in which drawing Figure 1 is a vertical diametral section of my improved shock absorber;

Figure 2 is a section on plane II—II of Figure 1;

Figure 3 is a section on plane III—III of Figure 2; and

Figure 4 shows a modified form of cam element for controlling the operation of the fluid displacement element.

In the structure shown the housing comprises a circular base 10 having apertured wings 11 thereon whereby it may be secured to a support as for example the chassis of an automotive vehicle. The base may be formed from sheet metal by suitable dies to provide a cylindrical peripheral flange 12 and a radial peripheral flange 13. The cylindrical flange 12 has exterior threading for receiving the open end of a cylindrical cup-shaped housing body 14 which may also be formed of sheet metal. When this body part is threaded to the base 10 they enclose a hydraulic working chamber 15, escape of fluid from the the chamber being guarded against by the interposition of a washer or gasket 16 between the base flange 13 and the edge of the body 14.

The fluid displacing structure within the chamber 15 comprises an open ended cylinder 17 arranged with its axis at right angles to the axis of the housing parts 10 and 14 and having outer and inner shaft ends 18 and 19 extending from opposite sides thereof concentric with the axis of the housing members 10 and 14, the cylinder and shaft ends being preferably an integral structure. The inner shaft end 19 has bearing support in the bearing boss 20 formed on the base 10, while the outer shaft end 18 has bearing support in a bearing bushing 21 secured in the outer wall of the housing body 14. Bushing 21 is inserted through the opening 22 provided in the outer wall of the body 14 and has the flange 23 at its inner end abutting against the inner side of this wall. A packing cup 24 surrounds the shaft and the flange 23 and contains packing material 25. The packing cup 24 seats against the annular shoulder 26 on the cylinder and at its opposite side the cylinder has the annular abutment shoulder 27 for seating against the inner face of the base 10 so that when the base 10 and housing 14 are screwed together the cylinder will be held aligned between the base 10 and the packing cup 24 and the packing material 25 will be compressed in order to seal against escape of fluid to the exterior of the housing between the shaft end 18 and the bearing bushing 21. The shaft end 18 at its outer end has secured thereto a lever arm 28 which, at its outer end, is usually connected by a link with the axle of the vehicle.

Reciprocable within the cylinder 17 are two opposed cup-shaped pistons 29 and 29' receiving a compression spring 30 interposed therebetween and tending to hold the pistons outwardly in the cylinder and to resist inward movement thereof. The pistons are of similar construction and each has at its outer end a longitudinally extending slot or recess 31 milled therein for receiving a roller 32 journaled by a pin 33 seated in the piston walls. These rollers ride against the inner surface of a cam ring member 34 seated within the housing body 14 concentric therewith and surrounding the cylinder. As shown this cam ring seats against the shoulder 35 provided in the housing body 14 and the ring may be secured against rotational displacement by welding to the body 14 or by other suitable securing means.

Depending from the cylinder is a nipple 36 providing a fluid inlet passage 37 to the cylinder, the nipple passage communicating at its outer end with the working chamber 15. Within the nipple is the annular seat 38 for the ball check valve 39, the arrangement being such that fluid may flow through the nipple passage into the cylinder but will be checked against reverse flow. A perforated cross wall 40 in the nipple passage limits the movement of the check ball away from its seat.

Extending upwardly from the upper part of the cylinder is a nipple 41 providing a valve chamber 42 communicating with the cylinder. In the arrangement shown there is a conical valve seat 43 at the bottom of the valve chamber for a conical valve 44 having a stem 45. A spring 46 encircling the stem abuts against the valve and an abutment plug 47 threaded into the outer end of the nipple and having the fluid passage 48. By adjusting this threaded abutment plug in the nipple the pressure of the spring against the valve may be readily adjusted for the desired resistance by the valve to flow of fluid from the cylinder. When the piston structures in the cylinder move outwardly fluid is drawn into the cylinder past the check valve 39. When the piston structures are moved inwardly the check valve is closed and when the pressure of the fluid becomes sufficient to overcome the force of the spring 46, the valve 44 will be opened for flow of fluid out of the cylinder, the valve 44 thus determining the resistance to such fluid outflow.

The movement of the pistons during oscillation of the cylinder is controlled by the spring 30 which tends to shift the pistons outwardly, and the form of the cam surfaces on the cam ring 34 engaged by the rollers 32. In the arrangement shown the cylinder, during static position of the shock absorber structure, is positioned with its axis horizontal. In the arrangement shown in Figure 2 the upper and lower portions A and A' of the cam surface are concentric with the axis of oscillation of the cylinder and the side portions B and B' of the cam surface are arcuate through a radius greater than that of the end sections A and A'. In the static position of the shock absorber the side cam surface portions B and B' are engaged at their midway points by the piston rollers 33 and the piston rollers are held in their innermost position against the force of the spring 30. For this static position of the shock absorber the arm 28 is shown as extending horizontally toward the right (Figure 1).

The operation is as follows. When the shock absorber arm 28 is moved upwardly from the static or normal position, no resistance is encountered, as the cam surface portions B and B' will allow the pistons to be moved outwardly in the cylinder by the spring 30. During this outward movement of the pistons fluid is drawn into the cylinder through the nipple passage 36 and past the check valve 39. During the return or downward stroke of the lever back toward the static or normal position, the pistons are forced inwardly toward each other by the cam surfaces engaged by the rollers 31, and pressure is built up in the cylinder against the discharge valve 44 and the return movement of the shock absorber is resisted. The pressure will eventually open the valve 44 against the pressure of the spring 46 and the shock absorber resistance will be measured by the resistance to the flow from the cylinder past the valve 44.

During downward swing of the arm from static position, the same operations occur, the pistons moving outwardly to draw fluid into the cylinder, which fluid, during inward movement of the pistons upon return of the arm to static position, will be discharged from the cylinder against the flow resistance past the valve 44. Thus, with the arrangement shown, the wheels of the vehicle may readily move upwardly as when a bump is encountered in the roadway, and may move readily downwardly as when a depression is encountered, but the follow up movement of the vehicle body is checked, resisted, and absorbed by the control of the fluid discharge from the cylinder by the valve 44.

By altering the shape of the cam the pressure may be varied or made to suit certain desirable conditions, either a slow or rapid building up or a combination of the two. The modified cam shown in Figure 4 has the portions C and C' normally engaged by the piston rollers, the faces of the cam surfaces extending at right angles to the axis of the cylinder when in normal position. Other forms of cam surface, arrangement and extent could be provided depending upon the service desired.

The shock absorber I have shown and described comprises comparatively few and simple parts which can be readily and economically manufactured and assembled. The cam rings may be made interchangeable so that a ring with cam formation thereon for the desired service may be readily installed.

I do not desire to be limited to the exact construction, arrangement, and operation shown and described as changes and modifications may be made without departing from the scope of the invention.

I claim as follows:

1. In a hydraulic shock absorber, a housing comprising a body in the form of an integral cylindrical cup and a detachable cover therefor, the circumferential wall of said cup having an internal annular shoulder, a cam ring insertable through the open end of the cup and seating against said shoulder, a shaft journaled in the cup bottom and in said cover and extending to the exterior of the housing, a cylinder supported on said shaft with its axis at right angles to the cup axis, pistons reciprocable in the ends of said cylinder and a spring therebetween, said cam ring having a cam surface on its inner side and said spring tending to hold said piston against said cam surface whereby during relative movement between said housing and shaft said pistons will be reciprocated, an inlet for comparatively free flow of fluid into said cylinder during outward movement of said pistons, a check valve for said inlet, an outlet for said cylinder for outflow of fluid when said pistons approach each other, and means for adjustably restricting said outlet.

2. In a hydraulic shock absorber, a housing comprising a body in the form of a drawn sheet metal cylindrical cup and a detachable cover therefor, the circumferential wall of said cup being deflected radially to provide an inner annular shoulder, a cam ring insertable through the open end of the cup to seat against said shoulder, a shaft journaled in the cup bottom and said cover and extending to the exterior of the housing for connection with a driving element, a cylinder supported by said shaft with its axis at right angles to the axis of the cup, pistons reciprocable in the ends of said cylinder and a spring therebetween, rollers at the ends of said pistons, said ring having a cam surface on its inner side and said spring tending to hold said pistons with their rollers against said cam surface whereby during relative movement between said housing and shaft said pistons will be reciprocated, ports for said cylinder for the inflow and outflow of fluid when the pistons are reciprocated, and means for controlling said ports.

MICHAEL FIELDMAN.